United States Patent

Gärtner et al.

[11] Patent Number: 5,280,886
[45] Date of Patent: Jan. 25, 1994

[54] ALTERNATING-RESILIENCE ENGINE MOUNT

[75] Inventors: Hanno Gärtner, Weinheim; Werner Hettler, Mannheim; Arnold Simuttis, Bad Kreuznach, all of Fed. Rep. of Germany

[73] Assignee: Firma Carl Freudenberg, Weinheim, Fed. Rep. of Germany

[21] Appl. No.: 861,737

[22] Filed: Apr. 1, 1992

[30] Foreign Application Priority Data

May 7, 1991 [DE] Fed. Rep. of Germany ....... 4114879

[51] Int. Cl.$^5$ .......................... F16F 13/00; B60K 5/12
[52] U.S. Cl. .................. 267/140.13; 267/219
[58] Field of Search ....... 267/140.11, 140.13, 267/140.14, 140.2, 219, 35; 248/562, 636; 180/300, 312

[56] References Cited

U.S. PATENT DOCUMENTS

| 4,399,974 | 8/1983 | Takei | 267/140.13 X |
| 4,415,148 | 11/1983 | Mair et al. | 267/140.11 X |
| 4,428,569 | 1/1984 | Takei | 267/140.11 X |
| 4,669,711 | 6/1987 | Beer | 267/140.14 X |
| 4,856,750 | 8/1989 | Le Fol | 267/140.13 X |
| 4,871,150 | 10/1989 | Le Salver et al. | 267/140.13 |

FOREIGN PATENT DOCUMENTS

| 0069787 | 1/1983 | European Pat. Off. | 267/140.13 |
| 0183197 | 6/1986 | European Pat. Off. | 248/562 |
| 3403002 | 6/1987 | Fed. Rep. of Germany . | |
| 2635155 | 2/1990 | France | 267/140.13 |
| 0270842 | 11/1987 | Japan | 267/219 |

Primary Examiner—Robert J. Oberleitner
Assistant Examiner—Peter M. Poon
Attorney, Agent, or Firm—Sprung Horn Kramer & Woods

[57] ABSTRACT

An alternating-resilience engine mount consists of a supporting component and a supported component, both of which move back and forth across an axis. The supported component is supported by the supporting component through the intermediary of two series-connected resilient rubber components. The motion of the second resilient component can be impeded when necessary by a so-called "auxiliary device". According to the invention, the two resilient components are interconnected and separated by a rigid tray.

14 Claims, 6 Drawing Sheets

ALTERNATING-RESILIENCE ENGINE MOUNT

BACKGROUND OF THE INVENTION

The invention concerns an alternating-resilience engine mount consisting of a supporting component and a supported component. Both components move back and forth in an axial direction. The supported component is supported by the supporting component through the intermediary of two resilient rubber components connected in series. The motion of one of the two resilient components can be impeded when necessary by so-called "auxiliary means".

An engine mount of this type is known from the German Patent No. 3,403,002. Its function depends on the interaction of two resilient components with different resilience that can be alternately engaged. A reversible electromagnetic coupling is aligned with the relatively harder component, and the combination is connected in parallel with the relatively softer component. As long as the coupling is disengaged, the relatively softer component will isolate high-frequency vibrations with short amplitudes. When the coupling is engaged, the resilience will equal the sum of the resiliencies of the two components connected in series.

To ensure a more or less smooth transition between the two resiliencies, they must not differ too extensively while the coupling is engaged and they are operating in parallel.

This known engine mount does not suppress a wide enough range of vibrations to be completely satisfactory. Another drawback is its complicated construction of many separate parts. The mount is also expensive to manufacture. It is also too high and too heavy.

SUMMARY OF THE INVENTION

A principal object of the present invention is to provide an improved engine mount of the aforesaid type that will isolate or suppress a wider range of vibrations and be simpler and less expensive to manufacture as well as lower in height and lighter in weight.

This object, as well as other objects which will become apparent from the discussion that follows, are achieved, in accordance with the invention, by interconnecting and separating the two resilient components in the engine mount by means of a rigid tray. The result is a highly effective alternating-resilience engine mount that suppresses an especially wide range of vibrations and is simple in design with few separate parts. As long as the auxiliary means are disengaged, permitting operation of the second resilient component, the two resilient components will be in series and their combined resilience will be soft. Lower-frequency vibrations with longer amplitudes, such as occur while the vehicle is being driven over rough roads, will be suppressed as the auxiliary means engage and impede the motion of the second resilient component. In this case, the vibrations are suppressed only by the first resilient component, the resilience of which is relatively hard as compared with that of the two series connected components. Since components with equal or differing resilience are employed as dictated by the design, the engine mount can be employed almost universally.

The tray in one advantageous embodiment of the invention has a surface that comes into contact with a counteracting surface on the supported component. The two surfaces can be brought into contact by hydraulic or by pneumatic means. The advantage is that the mount can be adapted to various uses. Whether the counteracting contact surface is associated with the supporting component or with the supported component is not essential to the mount's function.

The aforementioned means can comprise at least one piston-and-cylinder mechanism in the supported component or in the tray. The axis of motion of the piston-and-cylinder mechanism can parallel the axis of the engine mount. It is of advantage for the piston-and-cylinder mechanism to have three hydraulically activated cylinders distributed uniformly along a line parallel to the circumference of one of the resilient components. If a sensor accordingly senses discrepancies in the distance between the supporting component and the supported component that exceed a certain threshold, a signal will activate the cylinders, which will block one of the resilient components. The threshold can be stored in a computer or in electronic controls that will forward signals from the sensor. The cylinders can be activated by the oil already present for lubricating the engine, contributing to the reliability of the alternating-resilience engine mount. Three hydraulic cylinders uniformly distributed around the circumference of one of the resilient components will ensure uniform stress on the blocked component and will prevent the components from skewing in the housing when the auxiliary means are activated.

The auxiliary means in one alternative embodiment of the engine mount in accordance with the invention are integrated into the second resilient component in the form of a hollow interior that can be expanded by injecting a fluid into it under pressure. The second resilient component can expand parallel to the axis when the fluid is injected into its interior. The second resilient component can, while it is unexpanded, be radially separate from the contact surface on the tray and, when it is expanded, be tightly forced radially against that surface. The fluid can be oil for example. To suppress vibrations with long amplitudes, enough oil is injected into the interior of the resilient component to force it to bulge out radially against the tray, which can be accommodated in the first resilient component. The overall resilience will accordingly become hard enough to suppress the longer-amplitude vibrations. To obtain highly satisfactory isolation of high-frequency vibrations on the other hand, it is necessary only to reduce the pressure in the interior of the second resilient component, through a valve for example. The fluid can be injected into one of the resilient components through a fastener with a bore extending through it.

The auxiliary means in another advantageous embodiment of the invention comprise a bellows that expands when fluid is injected into its interior and can be forced against the tray and/or the counteracting contact surface and collapses automatically when depressurized. Such a bellows makes it possible to alternate the resilience of the engine mount very rapidly. The bellows can be pressurized through an opening in the adjacent supporting component or supported component.

The tray can be made of sheet metal. Appropriate shapes can be produced by deep drawing, for example extremely simply and cost-effectively. The tray can also be completely accommodated in at least one resilient component. This feature will ensure a gentle and silent contact between the contact surface and the counteracting contact surface when the auxiliary means is activated. The tray can be vulcanized for example into one of the resilient components.

The two resilient components in another advantageous embodiment at least partly overlap as they connect the supporting component to the supported component. The first resilient component in one preferred embodiment is annular, and its inside diameter is greater than the outside diameter of the second resilient component. The first resilient component can be a stack of rubber components instead of being annular. Since the two resilient components overlap at least to some extent, the engine mount will not be as high as the prior known engine mounts of this type.

The two resilient components can be secured to surfaces on the tray and/or on the supporting and supported components that extend across its axis. The advantage is that the stresses that occur inside the resilient components while the engine mount is in operation will be mainly compression and tension and not shear, which can curtail the life of the mount.

The preferred embodiments of the present invention will now be described with reference to the accompanying drawing.

DESCRIPTION OF THE PREFERRED EMBODIMENTS

Figure 1:
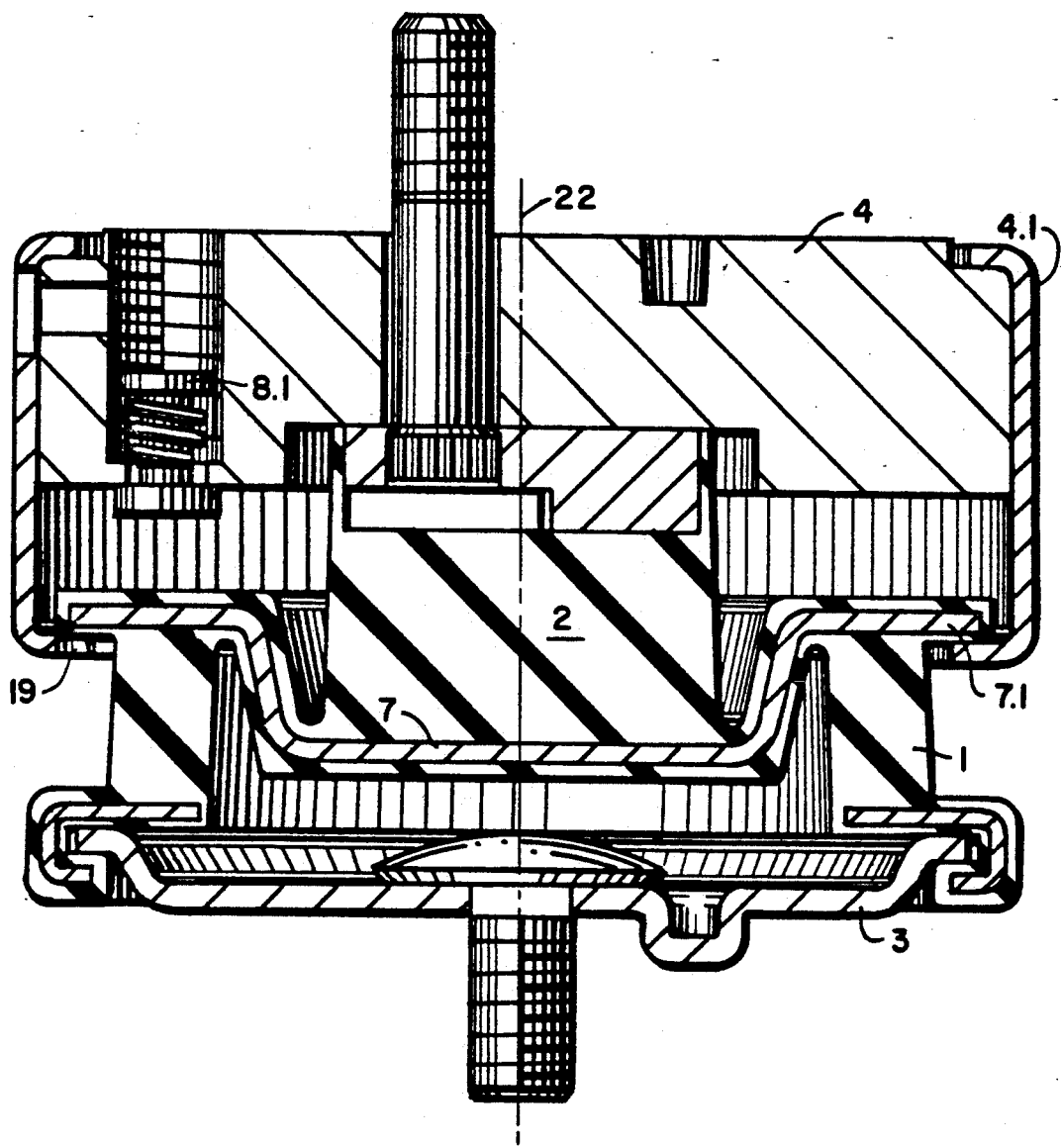
FIG. 1 is an axial cross-section of an engine mount consisting of a supporting component and a supported component coupled to each other throught two series connected resilient components. Three piston and cylinder means are associated with the supporting component.

The present invention will now be described with reference to FIGS. 1-8 of the drawings. Identical or similar elements in the various figures are identified with the same reference numerals.

The engine mount illustrated in FIG. 1 consists essentially of a supporting component 3 and a supported component 4 attached to each other by two interconnected resilient components 1 and 2. The resilient component 1 overlaps the resilient component 2 at least to some extent. The two are coaxial and radially separated. To increase the stability and prolong the life of the mount, the resilient components 1 and 2 are connected together by a rigid and bowl-shaped tray 7. The shape of this tray decreases the overall height of the mount. The tray 7 is completely accommodated inside the resilient components 1 and 2, resulting in a gentle and silent contact with pistons 8.1, 8.2 and 8.3, on one hand, and with counteracting contact surfaces 4.1 on the other. Counteracting contact surfaces 4.1 also protect the inside of the mount, especially resilient component 2, from outside contaminants, which extensively prolongs the mount's life. The three hydraulic cylinders and pistons 8.1, 8.2 and 8.3 are distributed uniformly along an arc concentric with resilient components 1 and 2. The cylinders could be accommodated in supporting component 3 instead of in supported component 4 as illustrated. Cylinders and pistons 8.2 and 8.3 are not shown in the drawing. The alternating-resilience engine mount is shown in the disengaged position. A contact surface 7.1 rests against the counteracting contact surface 4.1. In an installed engine mount subject to static load, the contact surface 7.1 on resilient components 1 and 2 will be approximately halfway up the annular gap between the supported component 4 and counteracting contact surface 4.1. To suppress vibrations with shorter amplitudes, resilient components 1 and 2 are aligned and their overall resilience is soft. While the vehicle is traveling over rough roads for example, cylinders and pistons 8.1, 8.2, and 8.3 are activated and will impede the motion of resilient component 2 by forcing the contact surface 7.1 against the counteracting contact surface 4.1. The harder resilience provided by the resilient component 1 alone will accordingly suppress the vibrations with longer amplitudes.

Figure 2:
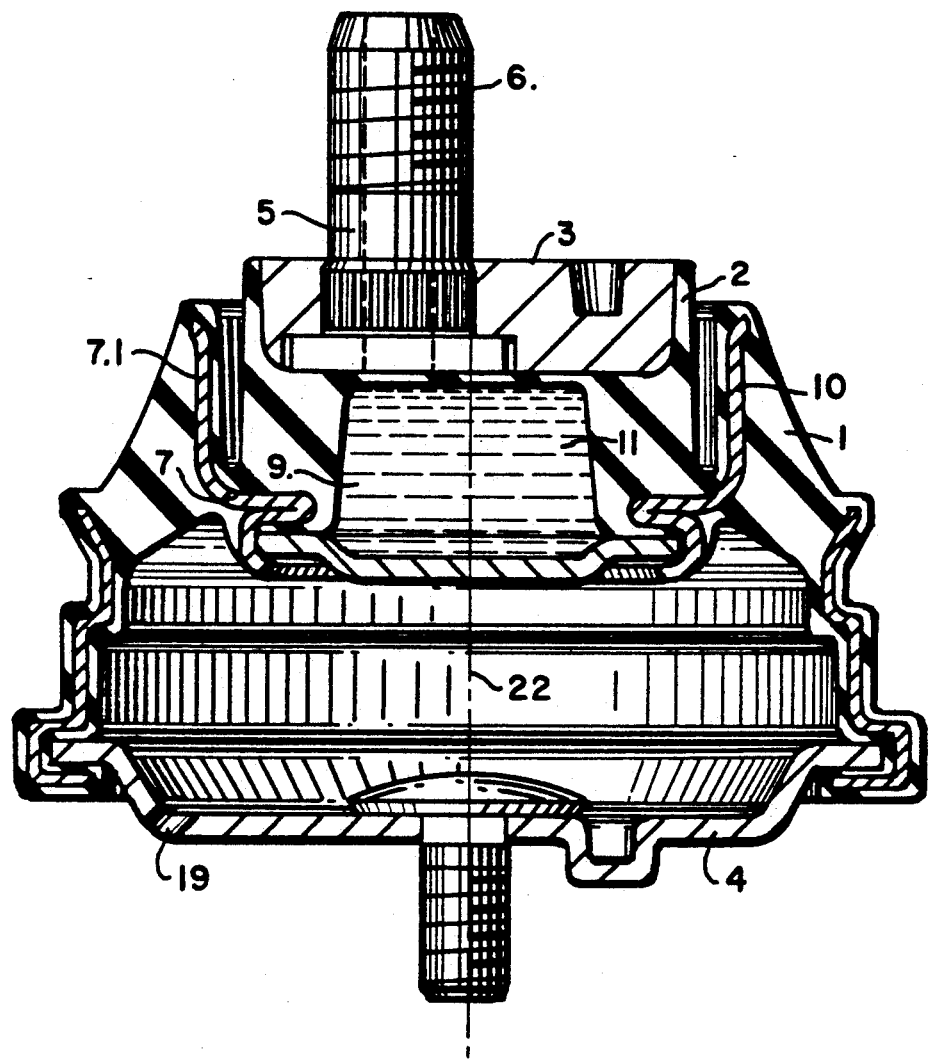
FIG. 2 is an axial cross-section of an engine mount consisting of a supporting component and a supported component attached to each other by two integrated resilient components with the second resilient component having a hollow interior.
Figure 3:
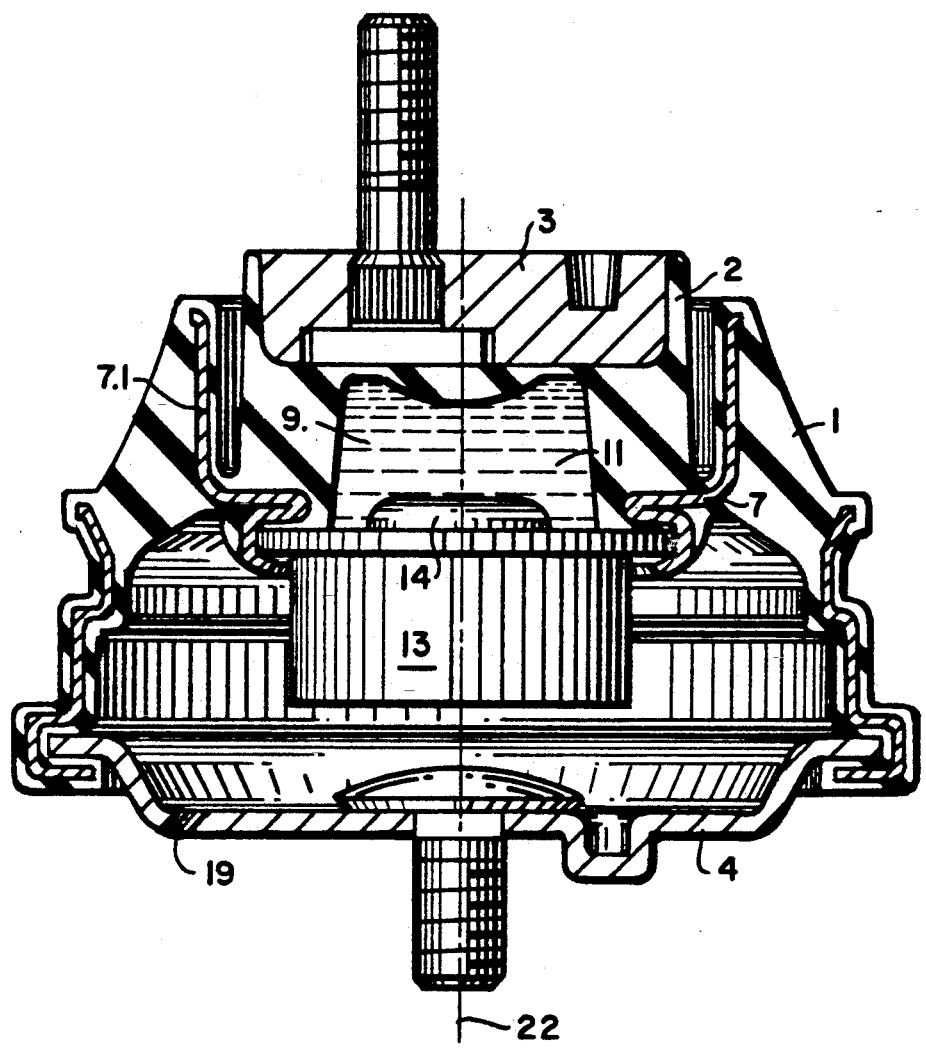
FIG. 3 is an axial cross-section of an engine mount like that illustrated in FIG. 2 but with a servo motor in the interior of the second resilient component.
Figure 4:
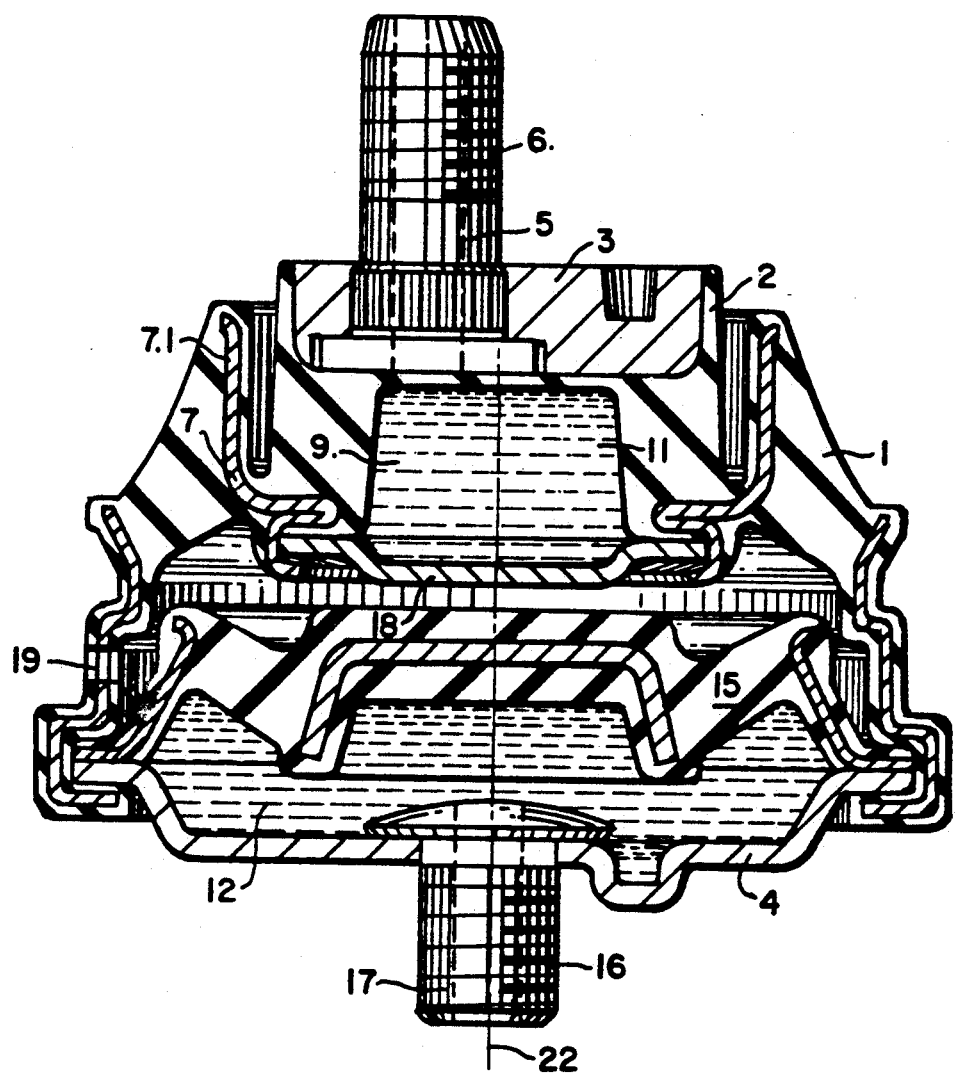
FIG. 4 is an axial cross section of an engine mount having another fluid compartment for tensioning it from inside and for hardening the resilience further.

FIGS. 2, 3, and 4 illustrate alternative versions of the embodiment illustrated in FIG. 1. The operating principle, however, is identical, depending essentially on the disengagement of one resilient component, the second in the present case, in the presence of vibrations with long amplitudes, for the purpose of suppressing them with a harder resilience.

The engine mount illustrated in FIG. 2 consists of a supporting component 3 and a supported component 4 attached to each other by two integrated resilient components. As long as the road is smooth, most of the vibrations encountered will derive from the engine and will have high frequencies and short amplitudes. Such vibrations can be effectively isolated. Longer amplitudes, like those encountered when driving over curbs for example, will be suppressed on the other hand. Fluid 9 will be injected through motor-accommodation component 5, which can simultaneously contain a line 6 for supplying the fluid, until the elastic wall of the hollow interior 11 comes into contact with the radially adjacent but separate wall 10 of resilient component 1. Wall 10 is reinforced with an insert in the form, for example, of an area of sheet metal bent out of the tray 7. The pressure of the fluid substantially hardens the engine mount's resilience both radially and axially.

The action of the second resilient component 2 in the engine mount illustrated in FIG. 3 can be inhibited by a piston 14 introduced into interior 11 by a servo motor 13. The short-amplitude vibrations that occur while the vehicle is being driven over a smooth road are very satisfactorily isolated as in the case of the engine mount illustrated in FIG. 2. Vibrations with longer amplitudes, however, will be suppressed as will now be described. A signal is forwarded to the servo motor 13 indicating that the relative motion between the supporting component 3 and the supported component 4 is too extensive. The motor activates the piston 14. Since fluid 9 is incompressible, it will force the wall of interior 11 to bulge out and come to rest, as in the embodiment illustrated in FIG. 2, against resilient component 1. The resilience of the mount will now feature a higher rigidity and lower-frequency vibrations will be suppressed.

The engine mount illustrated in FIG. 4 has an additional fluid chamber 12 demarcated by an elastic partition 15 and by the supported component 4. The motor-accommodation component 5 and mount-emplacement component 16 are provided with lines 6 and 17 that lead into the adjacent interior 11 and additional fluid chamber 12. High-frequency vibrations are suppressed as described with reference to FIGS. 1 through 3. Vibrations with longer amplitudes can be suppressed in two steps. When interior 11 is pressurized, the mount will function as described with reference to FIGS. 2 and 3. If the rigidity of resilient component 1 is inadequate with resilient component 2 blocked, an additional fluid chamber 12 can also be pressurized. The elastic partition 15 will move axially toward the adjacent bottom 18 of interior 11 and come to rest against it. The result will be an additional hardening of the resilience in conjunction with improved suppression of major deviations in both radial and axial direction of motion.

To ensure unexceptionable function of the alternating-resilience engine mounts illustrated in FIGS. 1 through 4, an air inlet and outlet 19 in the form of a bore, for example, must be provided in the vicinity of the fluid-filled interiors.

Figure 5:
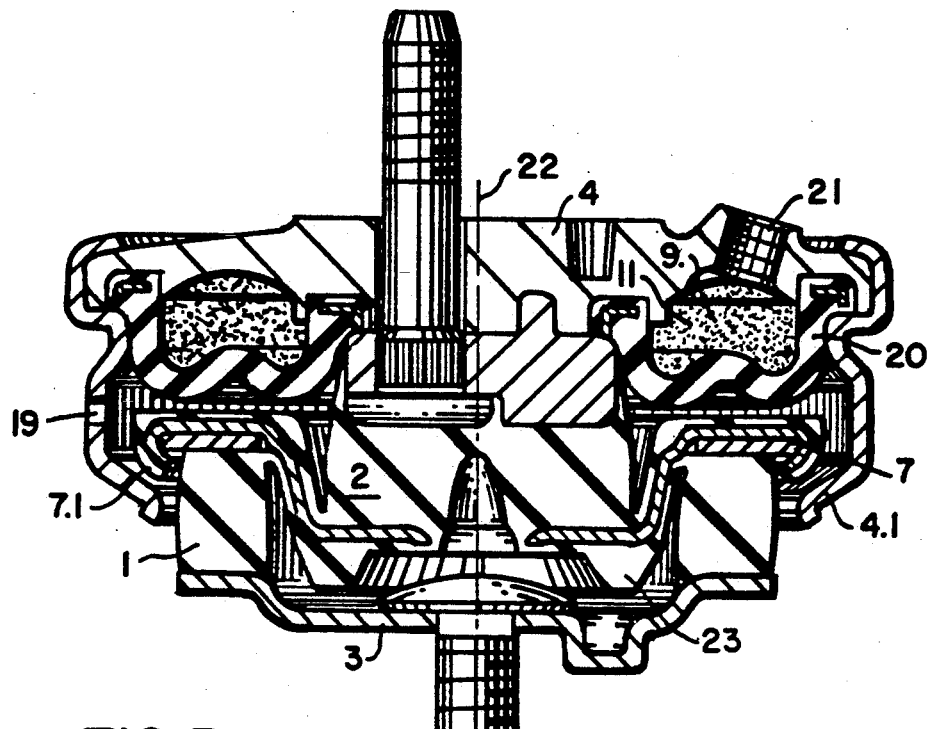
FIG. 5 is an axial cross section of an engine mount having a collapsing bellows.

The second resilient component 2 of the engine mount illustrated in FIG. 5 can be blocked by injecting fluid 9 into the interior 11 of auxiliary means in the form of a collapsing bellows 20. The bellows will expand and force the contact surface 7.1 of the tray 7 firmly against the counteracting contact surface 4.1 of the supported component 4. This mount is subjected to static load, and the second resilient component 2 is not blocked but aligned with first resilient component 1. The result is a comparatively soft overall resilience. The interior 11 of bellows 20 can when necessary be filled with fluid 9 through an opening 21. The axial travel of first resilient component 1 is limited by buffers 22 in the form of rings or distributed uniformly along the circumference. In addition to slight mechanical stresses on first resilient component 1, buffers 22 also decrease noise when the engine mount is employed as intended.

Figure 6:
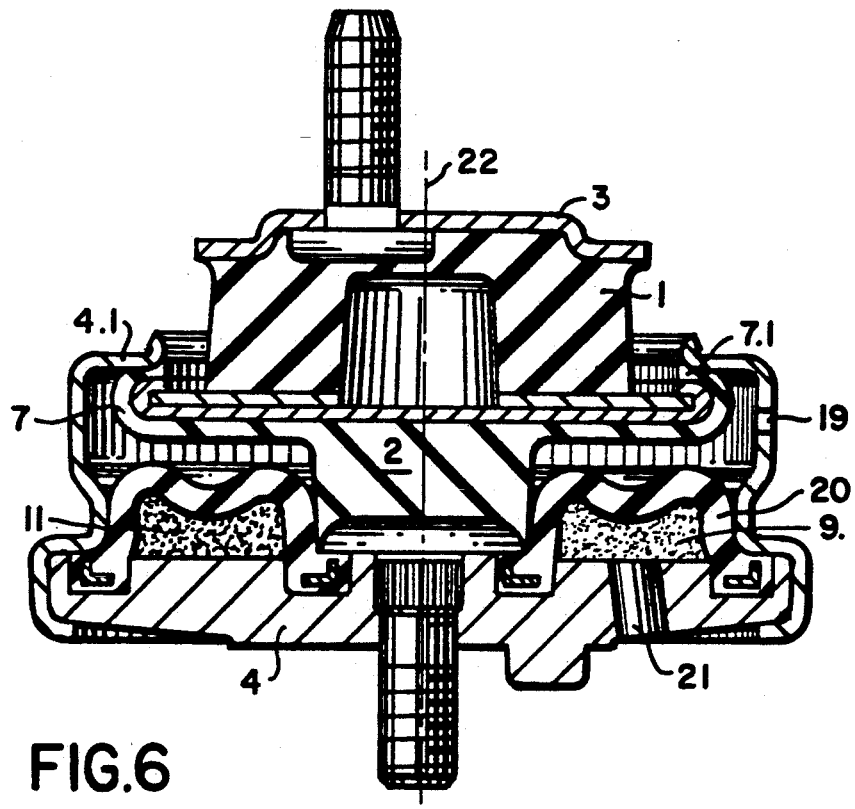
FIG. 6 is an axial cross section of an engine mount similar to, but less extensive radially than the mount illustrated in FIG. 5.
Figure 7:
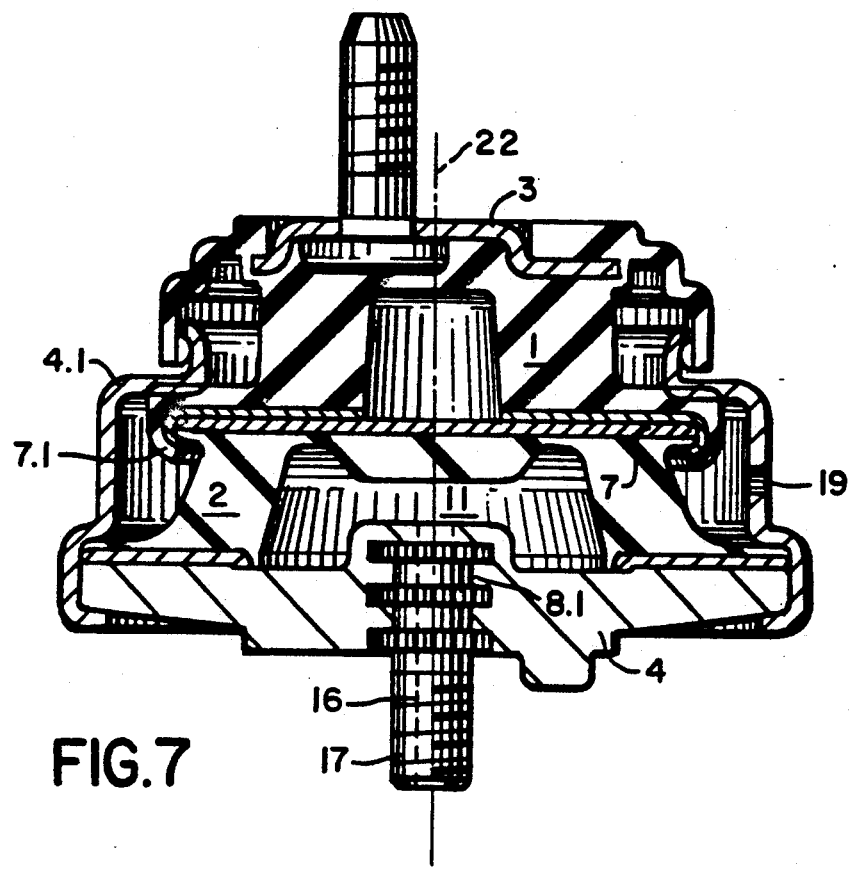
FIG. 7 is an axial cross section of an engine mount with two resilient components having almost the same dimensions radially.
Figure 8:
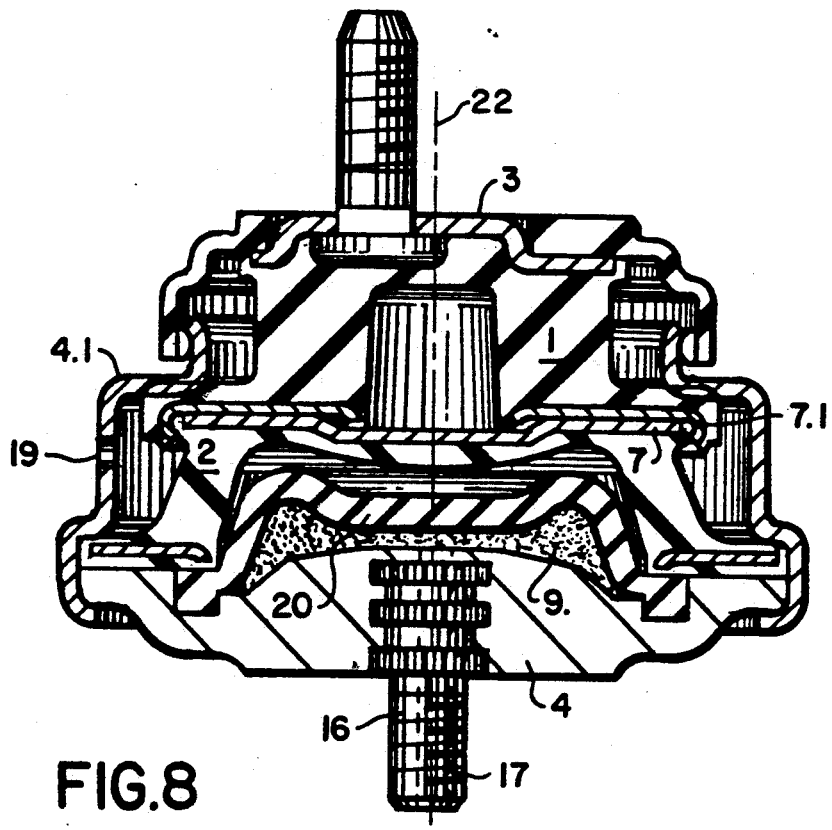
FIG. 8 is an axial cross section of an engine mount having a collapsing bellows that can be expanded against the adjacent resilient component, which will not come into contact with the fluid.

FIGS. 6, 7, and 8 illustrate the mounts unloaded, with the contact surfaces 7.1 of the tray 7 resting against the counteracting contact surface 4.1 of supported component 4 and with interiors 11 unpressurized.

FIG. 6 illustrates an engine mount similar to the one illustrated in FIG. 5 but radially less extensive due to the different dimensions of resilient components 1 and 2.

The variable engine mount illustrated in FIG. 7 is also radially less extensive. Resilient components 1 and 2 are secured to a flat tray 7. Mount-emplacement component 16 has a line 17 through it for injecting a fluid into an interior 11 adjacent to the supported component. An axially moving piston can be accommodated in the mount-emplacement component of another and unillustrated version to block the second resilient component 2 when necessary by forcing the contact surface 7.1 of the tray 7 firmly against the counteracting contact surface 4.1 on the supported component 4.

FIG. 8 illustrates a variable engine mount like that illustrated in FIG. 7, although the second resilient component 2 does not come into contact with fluid 9. This embodiment is especially practical when the fluid is corrosive and might attack the second resilient component and curtail the life of the mount. The bellows 20 illustrated in FIG. 8, like those illustrated in FIGS. 5 and 6, collapses and will not affect the mount's resilience when the interior until the interior is pressurized. In this case as well, the mount-emplacement component 16 has a line 17 extending through it for injecting fluid 9 into the interior 11. A line through the supporting component 3 as illustrated for example in FIG. 5, could be employed instead.

The engine mounts illustrated in FIGS. 1 through 8 are highly reliable, compact, and light in weight and are simple and inexpensive to manufacture.

There has thus been shown and described a novel alternating-resilience engine mount that fulfills all the objects and advantages sought therefor. Many changes, modifications, variations, and other uses and applications of the subject invention will, however, become apparent to those skilled in the art after considering this specification and the accompanying drawings, which disclose the preferred embodiments thereof. All such changes, modifications, variations, and other uses and applications that do not depart from the spirit and scope of the invention are deemed to be covered by the invention, which is to be limited only by the claims that follow.

What is claimed is:

1. In an alternating-resilience engine mount consisting of a supporting component and a supported component, both of which move back and forth in an axial direction, wherein the supported component is supported by the supporting component through the intermediary of two series-connected resilient rubber components, wherein auxiliary means are provided for selectively impeding the motion of the second resilient component and wherein the two resilient components are interconnected and separated by a rigid tray that is covered by a layer of rubber; the improvement wherein the tray is cup shaped; wherein the first and the second resilient components are in contact with the rigid tray and at least partially overlap in the axial direction of the engine mount, and wherein the rubber layer covering the tray is formed integrally with at least one of the resilient components.

2. The alternating-resilience engine mount defined in claim 1, wherein the tray has a surface that comes into contact with a counteracting surface on at least one of the supported component and the supporting component.

3. The alternating-resilience engine mount defined in claim 2, wherein the auxiliary means include fluid actuated means for selectively bringing the two surfaces into contact.

4. The alternating-resilience engine mount defined in claim 2, wherein the auxiliary means comprise a bellows that expands when fluid is injected into its interior and can be forced against at least one of the tray and the counteracting contact surface, and that collapses automatically when depressurized.

5. The alternating-resilience engine mount defined in claim 1, wherein the auxiliary means comprises at least one piston and cylinder mechanism.

6. The alternating-resilience engine mount defined in claim 5, wherein said piston and cylinder mechanism is located on at least one of the supported component and the supporting component.

7. The alternating-resilience engine mount defined in claim 5, wherein said piston and cylinder mechanism is located on the tray.

8. The alternating-resilience engine mount defined in claim 5, wherein an axis of motion of the piston and cylinder mechanism parallels an axis of the engine mount.

9. The alternating-resilience engine mount defined in claim 1, wherein the auxiliary means are integrated into the second resilient component in the form of a hollow interior that can be expanded by injecting a fluid into it under pressure.

10. The alternating-resilience engine mount defined in claim 9, wherein the second resilient component can expand parallel to an axis of the engine mount when the fluid is injected into its interior.

11. The alternating-resilience engine mount defined in claim 9, wherein the second resilient component can, while it is unexpanded, be radially separate from a contact surface on the tray and, when it is expanded, be tightly forced radially against that surface.

12. The alternating-resilience engine mount defined in claim 1, wherein the tray is made of sheet metal.

13. The alternating-resilience engine mount defined in claim 1, wherein the two resilient components at least partly overlap in an axial direction of the engine mount as they connect the supporting component to the supported component, one of said resilient components being annular in shape and the other resilient component fitting at least partially within said one resilient component.

14. The alternating-resilience engine mount defined in claim 1, wherein the two resilient components are secured to surfaces on at least one of the tray and the supporting and supported components that extend across its axis.

* * * * *